(12) United States Patent
Hurtta et al.

(10) Patent No.: US 9,386,612 B2
(45) Date of Patent: Jul. 5, 2016

(54) METHOD AND SYSTEM FOR ESTABLISHING A CONNECTION BETWEEN NETWORK ELEMENTS

(75) Inventors: Tuija Hurtta, Espoo (FI); Janne Koistinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 355 days.

(21) Appl. No.: 13/566,944

(22) Filed: Aug. 3, 2012

(65) Prior Publication Data

US 2013/0034065 A1 Feb. 7, 2013

Related U.S. Application Data

(60) Division of application No. 12/698,053, filed on Feb. 1, 2010, now abandoned, which is a continuation of application No. 11/826,463, filed on Jul. 16, 2007, now Pat. No. 7,684,786, which is a division of application No. 10/398,412, filed as application No. PCT/EP00/09884 on Oct. 9, 2000, now Pat. No. 7,944,813.

(51) Int. Cl.
| | |
|---|---|
| *H04M 11/00* | (2006.01) |
| *H04M 3/00* | (2006.01) |
| *H04W 72/00* | (2009.01) |
| *H04W 4/00* | (2009.01) |
| *H04W 76/02* | (2009.01) |
| *H04L 29/06* | (2006.01) |

(52) U.S. Cl.
CPC ......... *H04W 76/021* (2013.01); *H04L 65/1069* (2013.01); *H04W 76/022* (2013.01)

(58) Field of Classification Search
CPC ..... H04W 12/06; H04W 12/12; H04W 8/245; H04W 72/04; H04W 76/02; H04W 16/10; H04W 84/02; H04W 88/02; H04L 63/08; H04L 45/28; H04L 45/22; H04L 45/00; H04L 29/06; H04M 1/72525; H04M 1/72522
USPC .............. 455/411, 432.1, 418, 450, 454, 518, 455/403, 406, 466; 370/218, 252, 328, 396, 370/337, 349, 401, 352, 438, 470, 261; 709/246; 713/260
See application file for complete search history.

(56) References Cited

U.S. PATENT DOCUMENTS

| | | | | |
|---|---|---|---|---|
| 5,128,981 A | * | 7/1992 | Tsukamoto et al. | 455/450 |
| 5,583,864 A | * | 12/1996 | Lightfoot et al. | 370/396 |
| 6,600,732 B1 | * | 7/2003 | Sevanto et al. | 370/349 |
| 7,609,721 B2 | * | 10/2009 | Rao et al. | 370/470 |

(Continued)

*Primary Examiner* — William D Cumming
(74) *Attorney, Agent, or Firm* — Mintz Levin Cohn Ferris Glovsky and Popeo, P.C.

(57) ABSTRACT

Establishing or handling a connection between a first and a second network element connected to different networks such as GPRS/UMTS and IP-based networks is disclosed. The connection is established via at least a third network element such as a SGSN or GGSN arranged in one of the networks. The third network element is adapted to send, when receiving information on an establishment of a connection, a request to a fourth network element which may be a Call State Control Function, a Policy Control Function, or a Call Processing Server. The request requests permission for establishing a type of connection, or requests a check of a connection parameter, and specifies the first and/or second network element and/or the connection or connection type to be established. The fourth network element returns a response specifying a permission for establishing a connection or connection type, or a connection parameter.

10 Claims, 7 Drawing Sheets

(56) References Cited

U.S. PATENT DOCUMENTS

| | | | |
|---|---|---|---|
| 7,684,786 B2* | 3/2010 | Hurtta et al. | 455/411 |
| 7,742,186 B2* | 6/2010 | Murakami et al. | 358/1.15 |
| 7,944,813 B1* | 5/2011 | Hurtta et al. | 370/218 |
| 2002/0032800 A1* | 3/2002 | Puuskari et al. | 709/246 |
| 2002/0034935 A1* | 3/2002 | Bjelland et al. | 455/403 |
| 2002/0037736 A1* | 3/2002 | Kawaguchi et al. | 455/518 |
| 2002/0127995 A1* | 9/2002 | Faccinn et al. | 455/406 |
| 2002/0176405 A1* | 11/2002 | Aijala | 370/352 |
| 2003/0013467 A1* | 1/2003 | Caloud | 455/466 |
| 2003/0039232 A1* | 2/2003 | Casati et al. | 370/337 |
| 2003/0058874 A1* | 3/2003 | Sahaya et al. | 370/401 |
| 2005/0114694 A1* | 5/2005 | Wager et al. | 713/200 |
| 2006/0034195 A1* | 2/2006 | Blaiotta et al. | 370/261 |
| 2006/0037072 A1* | 2/2006 | Rao et al. | 726/14 |
| 2006/0039354 A1* | 2/2006 | Rao et al. | 370/352 |
| 2006/0039355 A1* | 2/2006 | Rao et al. | 370/352 |
| 2006/0039356 A1* | 2/2006 | Rao et al. | 370/352 |
| 2006/0039404 A1* | 2/2006 | Rao et al. | 370/465 |
| 2006/0101408 A1* | 5/2006 | Kotamarthi et al. | 717/126 |
| 2006/0146859 A1* | 7/2006 | Baldwin et al. | 370/438 |
| 2006/0190719 A1* | 8/2006 | Rao et al. | 713/160 |
| 2007/0041043 A1* | 2/2007 | Murakami et al. | 358/1.15 |
| 2007/0121539 A1* | 5/2007 | Kikuchi | 370/328 |
| 2007/0254637 A1* | 11/2007 | Plant et al. | 455/418 |
| 2007/0259661 A1* | 11/2007 | Hurtta et al. | 455/432.1 |
| 2007/0280123 A1* | 12/2007 | Atkins et al. | 370/252 |
| 2008/0004035 A1* | 1/2008 | Atkins et al. | 455/454 |
| 2008/0092211 A1* | 4/2008 | Klemets et al. | 726/3 |
| 2009/0052870 A1* | 2/2009 | Marsh et al. | 386/124 |
| 2009/0217356 A1* | 8/2009 | Scott et al. | 726/4 |
| 2010/0005288 A1* | 1/2010 | Rao et al. | 713/151 |

* cited by examiner

METHOD AND SYSTEM FOR ESTABLISHING A CONNECTION BETWEEN NETWORK ELEMENTS

CROSS REFERENCE TO RELATED APPLICATION

This application is a divisional application of U.S. patent application Ser. No. 12/698,053, filed on Feb. 1, 2010, entitled "METHOD AND SYSTEM FOR ESTABLISHING A CONNECTION BETWEEN NETWORK ELEMENTS,", which is a continuation application of U.S. patent application Ser. No. 11/826,463, filed on Jul. 16, 2007, entitled "METHOD AND SYSTEM FOR ESTABLISHING A CONNECTION BETWEEN NETWORK ELEMENTS," (now U.S. Pat. No. 7,684,786), which claims the benefit of U.S. patent application Ser. No. 10/398,412, filed on Aug. 26, 2003, (now U.S. Pat. No. 7,944,813) and also claims the benefit under 35 U.S.C. §371 of PCT/EP00/09884, filed Oct. 9, 2000. The contents of the aforementioned applications are hereby incorporated by reference in their entirety.

FIELD OF THE INVENTION

The invention relates to a method and system for establishing a connection between two or more network elements. The connection may for example be a VoIP (Voice over Internet Protocol) call. The connection may involve e.g. an IP telephony layer or network and a GPRS/UMTS-based network transporting the call.

BACKGROUND OF THE INVENTION

Generally, for properly establishing and handling a connection between network elements such as a user equipment, for instance a mobile terminal, and another user terminal or database, etc., one or more intermediate network elements such as support nodes are involved. One or more connection parameters are used for defining connection characteristics such as PDP (Packet Data Protocol) context information, quality of service (QoS) requested or provided, charging-related information such as charging tariff, etc.

In particular in a case when a connection involves two or more networks of different types such as networks using different transmission protocols, e.g. GPRS/UMTS-based networks and IP-based networks, problems may occur in properly establishing the connection and setting the connection parameters.

SUMMARY OF THE INVENTION

The present invention provides a method and system which are able to properly establish a connection between network elements, e.g. arranged in different networks, in an advantageous manner, as defined in the attached claims.

The connection can be properly established or processed, e.g. for charging purposes, by exchanging request and response between the third and fourth network element related to the permission for establishing a connection (or connection type such as PDP type), or to a connection parameter such as QoS (Quality of Service) so as to ensure correct handling of the connection.

The third network element may be a support node, preferably a gateway support node whereas the fourth network element may be a CSCF or PCF or CPS. The fourth network element may be part of, or provide, a IP telephony layer.

In accordance with one of the aspects of the invention, the communication happens between the PS (packet-switched) domain (e.g. GGSN or SGSN) and between the IM subsystem (CSCF).

According to one of the preferred embodiments of the invention, the fourth network element such as the IP telephony layer is allowed to control at least one connection parameter, e.g. to restrict a PDP (Packet Data Protocol) context activation or modification. For example, a conversational PDP context, i.e., a connection enabling a conversation between the caller and the callee, may only be activated when the first network element, e.g. a mobile terminal, is trying to make a call to the second network element. When, as an example, the connection parameter is a PDP context, and an activation or modification of PDP context is requested, the third network element such as a GGSN may send a permission request to the fourth network, such as CSCF or PCF or CPS, in order to check whether the PDP context activation or modification can be accepted.

This approach provides several advantages. First, the fourth network element such as CSCF learns the address of the third network element, e.g. the GGSN, from the request and therefore knows where to return the response. Otherwise, when the fourth network element were designed to send the information to the third network element before being addressed by the third network element, problems may arise when the fourth network element does not have information on the address of the third network element in charge of handling the connection.

Even when the first network element, e.g. a mobile terminal, should directly send information to the fourth network element when trying to establish a connection such as a call, the first network element does not yet have information on the address of the third network element in charge of subsequently handling the connection, and can therefore not send this address information to the fourth network element. Furthermore, if a message such as an authorize message would first be sent from the fourth to the third network element, the third network element would have to store information on call handling parameters such as PDP contexts which are not yet active. The third network element might then have to activate a timer, and to remove the authorize information after timer expiry, in case the PDP context activation should not be performed for some reason.

Furthermore, the solution proposed according to the present invention works also for roaming subscribers and thus provides additional advantage.

Generally, according to an aspect, the invention provides a solution for restricting e.g. PDP context activation or modification based on a call that will be carried on the PDP context.

According to one of the preferred embodiments of the invention, a common identifier is provided in the networks or layers working according to different protocols, e.g. in the GPRS/UMTS layer and the IP telephony layer, as well as in a control means or function such as CSCF or PCF. This common identifier may be used to map a PDP context to a call. The common identifier may be e.g. a call identifier such as Call_Id already provided in SIP (Session hiitiation Protocol) messages.

As an alternative, the common identifier may also be an identifier allocated in one, of the layers, e.g. in the GPRS/UMTS layer. For instance, the common identifier in this case may be NSAPI. In this case, this common identifier is preferably sent to the fourth network element, e.g. the CSCF, in a protocol message such as the INVITE message of SIP. The common identifier (e.g. NSAPI) may then be sent from the third network element, e.g. GGSN, to the fourth network element (e.g. PCF) as well as from a fifth network element (e.g. CSCF) to the fourth network element. The fourth network element then maps a request (sent by the third network element) and an authorization (sent by the fifth network element such as CSCF) based on the common identifier, e.g. NSAPI.

In accordance with a further preferred embodiment of the invention, a mechanism is provided for combining a connection parameter such as charging info generated in a first network such as mobile core network (e.g. SGSN and GGSN), and in another network such an IPT (IP-based telephony) core network, e.g. CPS. According to this embodiment, a possibility for charging of QoS (Quality of Service) level used in telephony calls is provided.

According to this aspect of the invention, a mechanism for combining the call-related charging info and for controlling relevancy between QoS reservation in the one network (e.g. IPT network, with IPT QoS reservation being sent e.g. in the INVITE message of SIP) and QoS reservation (e.g. PDP context QoS context activation) in the other network (e.g. mobile packet core network) is provided. As an example, the delivered identifier such as Callid is checked for charging purposes, and the requested QoS level relevancy or request is also checked both in the protocol message (e.g. SIP: INVITE) and PDP context activation message(s).

A new parameter may be introduced in PDP context activation for informing the third network element such as GGSN about the fourth network element such as serving CSCF, or integrated CSCF/PCF, or CPS. Therefore, the third network element is informed on the address of the fourth network element to which the QoS check request is to be sent.

A further optional feature controllable by the end-user may be the possibility of requesting a QoS check by a terminal (e.g. first network element) in a protocol message such as SIP: INVITE.

According to this aspect of the invention, the preparation of a charging record based on QoS provided is possible.

DETAILED DESCRIPTION OF PREFERRED EMBODIMENTS OF THE INVENTION

Figure 1:
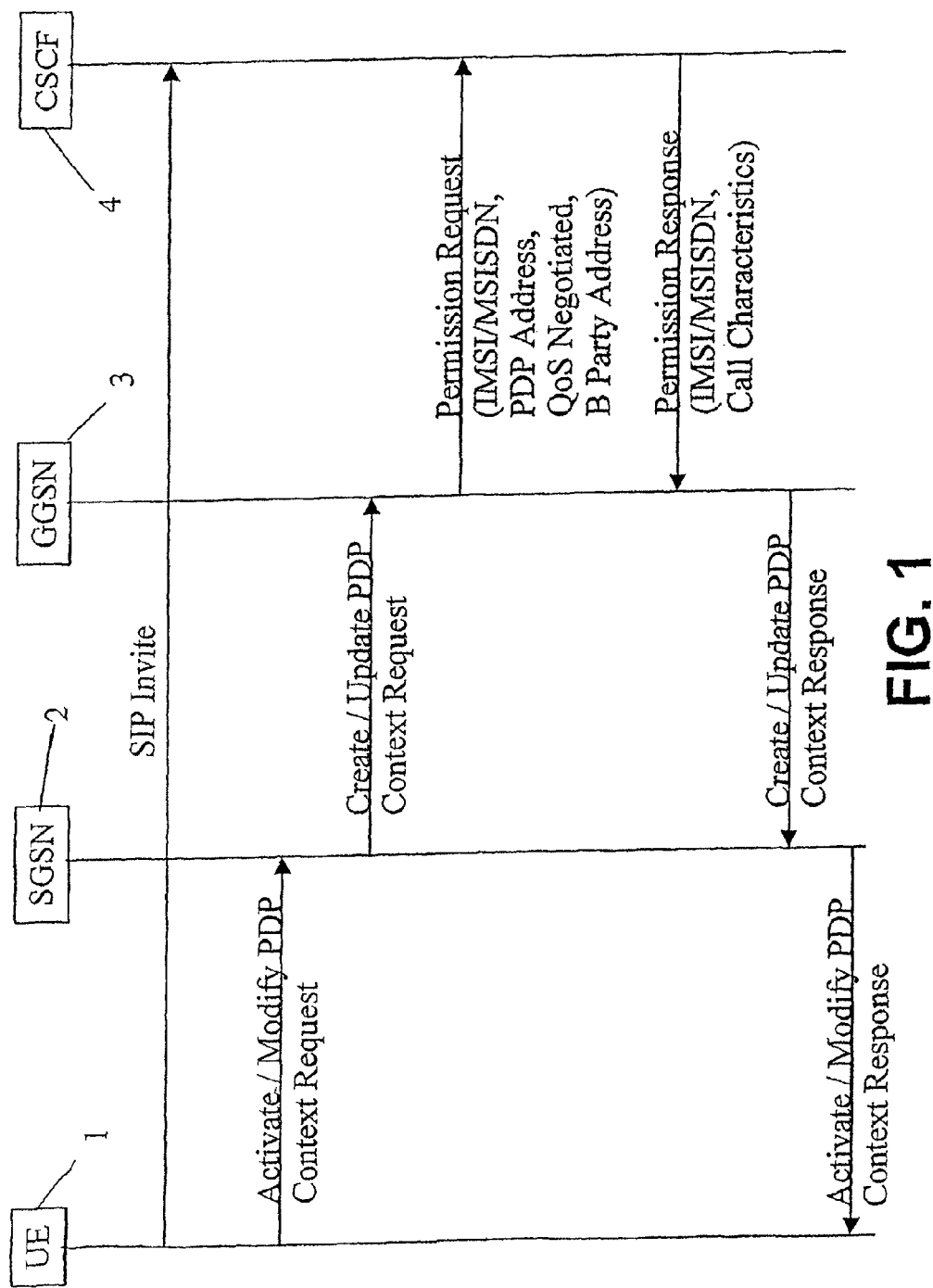
FIG. 1 shows the basic structure and message flow according to one embodiment of a method and system according to the invention.

FIG. 1 illustrates a first embodiment of a method or system in accordance with the invention. This embodiment provides a CSCF-permitted PDP context activation or modification. A user equipment (UE) 1 is a first network element which may a mobile station. SGSN 2 represent a serving node (serving GPRS support node) which serves user equipment 1 in handling a connection to another network element (second network element) such as a terminal of a called party which is not shown in FIG. 1. GGSN (Gateway GPRS Support Node) 3 represents a gateway node for handling connections to another network to which the called party terminal may be attached.

A Call State Control Function (CSCF) 4 represents a fourth network element which decides on permission of PDP context activation or modification.

When the user equipment 1 intends to make a call to a terminal arranged in another network, e.g. an IP-based network, it sends a message such as an INVITE message of SIP (Session Initiation Protocol) to the CSCF 4. Thereafter, preferably after having received a response from CSCF 4 informing on the acceptance of the call request, the user equipment 1 sends an Activate (or Modify) PDP context request to SGSN 2. The SGSN 2 in response to this Activate (or Modify) PDP context request, sends a Create (or Update) PDP context request to GGSN 3.

In response to this request from SGSN 2, the GGSN 3 does not immediately perform a Create or Update of the PDP contexts but is adapted first to send a permission request to CSCF 4. In the embodiment of FIG. 1, the GGSN 3 sends this permission request to the CSCF 4 in order to check whether PDP context activation/modification can be accepted. In a modified embodiment, the permission request may also be sent to a policy control function PCF which may represent an additional optional network element or may be integrated with CSCF.

The GGSN 3 includes IMSI/MSISDN (and possibly the PDP address) in the permission request to identify the mobile, that is the user equipment 1. The GGSN 3 may additionally send, in the permission request, the requested QoS (Quality of Service) values as well as the address of the called party (B Party Address), if present in the traffic flow template TFT. If IMSI/MSISDN (and possibly PDP address) should not be sufficient to identify the user equipment 1 or the call, an additional information such as NSAPI may be used and transmitted to GGSN 3. In this case, the user equipment 1 preferably sends the information NSAPI of the PDP context in a call-set up message to the CSCF, e.g. in the SIP: INVITE message. The CSCF 4 (or if alternatively or additionally provided PCF) is then adapted to check that the NSAPI for the call contained in the call-set up message equals the NSAPI for the PDP context sent from the GGSN 3 in the permission request, so that the CSCF 4 (or the PCF) can authorize the correct PDP context. If there should be provided a separate PCF, the CSCF 4 is adapted to send the NSAPI to the PCF. Likewise, in this case, the GGSN 3 is adapted to send the permission request including NSAPI to the separate PCF.

In response to the permission request and after effecting the above described cheek, the CSCF 4 (or the PCF) sends a Permission response to the GGSN 3. The permission response includes IMSI/MSISDN for identifying the user equipment 1 or the call for which the PDP context is to be created or updated, and preferably additionally includes information such as "call characteristics". The call characteristics information preferably includes accepted QoS values, accepted B Party Information (preferably IP address and the port number of the called party), as well as an indication indicating whether the call is a normal call or an emergency call.

The GGSN 3 is adapted to set the QoS values to the ones received from the CSCF 4 (or the PCF). The GGSN 3 can set the allocation/retention priority to the highest value if the call is an emergency call. Furthermore, the GGSN 3 can set the traffic flow template TFT according to the B Party Information.

In case the call is an emergency call and the PDP context is used for this emergency call, the user equipment 1 may be informed thereon by sending this information from the GGSN 3 to the SGSN 2 which will forward this information to the (mobile) user equipment 1.

For sending the permission request, the GGSN 3 must know the address of the CSCF 4 for communication. In one embodiment of the invention, the CSCF address is added as a new parameter to the Activate (or Modify) PDP context request and the Create (or Update) PDP context request messages. In an alternative embodiment, the GGSN 3 is implemented to derive the CSCF address from the TFT of the signalling PDP context.

Further, the GGSN 3 may also be informed in some other way on the CSCF 4 address.

When another network element such as PCF is provided for deciding on the permission, the address of this network element (such as PCF) may be configured to the GGSN 3 (per access point) and to the CSCF 4.

Further, in accordance with another possible aspect of the invention, if the above described functionality (Permission Request and Permission Response) is also to be provided for roaming subscribers, a new parameter describing whether or not a permission from the CSCF (or the PCF) is needed at PDP context activation (or modification), is added to the subscription information in the subscriber database (such as Home Location Register HLR). This new parameter can be PDP context specific.

Returning now to FIG. 1, after receipt of the Permission Response, the GGSN 3 sets the PDP context and further information as necessary in accordance with the information contained in the Permission Response, such as accepted QoS value etc. Further, the GGSN 3 returns a Create (or Update) PDP context response to SGSN 2. In response thereto, the SGSN 2 sends an Activate (or Modify) PDP context response to the user equipment 1. Thereupon, the call is established and carried-out in the known manner.

Figure 2:
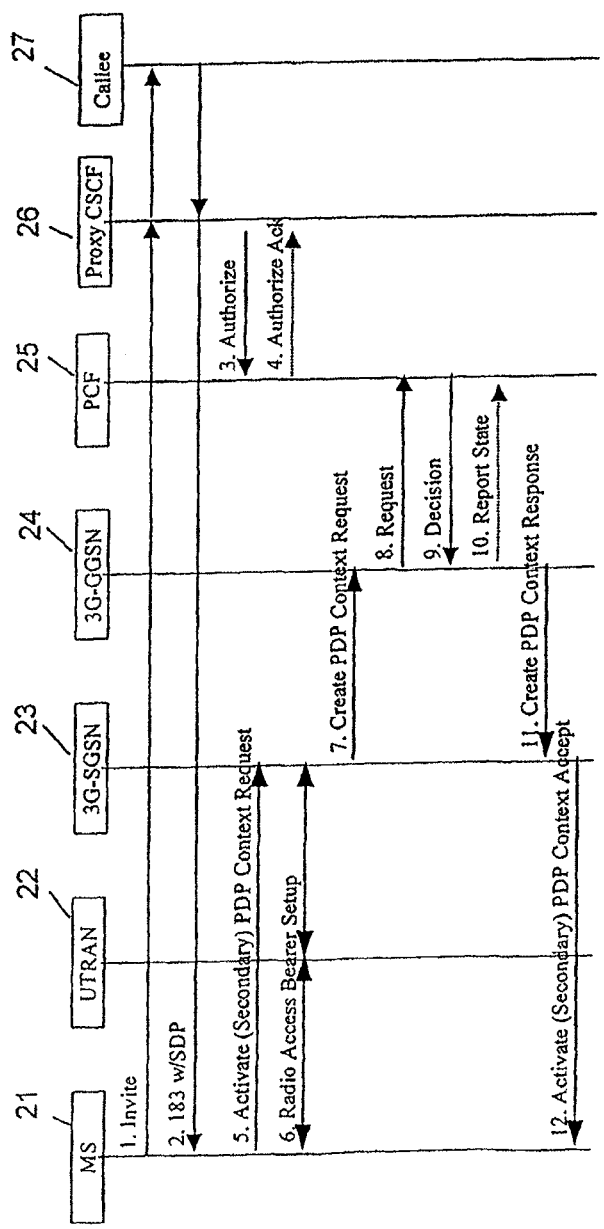
FIG. 2 illustrates a further embodiment of a system and method in accordance with the present invention.

FIG. 2 shows a further embodiment of the invention (method and/or system) which is provided with a Policy Control Function (PCF). The PCF has an interface towards the GGSN as well as to the CSCF. The PCF can be used for the communication between the IP telephony layer, i.e. proxy CSCF, and the GPRS/UMTS layer (GGSN). For example, a call can have effects on the PDP context which is activated for the call.

FIG. 2 illustrates an example for the communication and message flow between the GPRS/UMTS layer, i.e. the GGSN, and the IP telephony layer, i.e. the CSCF, via the PCF. The IP telephony layer is allowed to restrict PDP context activation (or modification).

According to FIG. 2, a call-based permission for PDP context activation/modification is performed. The case shown presents a PDP context activation in case of a mobile originated (MO) call, that is a call originating from mobile station (MS) 21, the called party (callee) being represented by network element 27 (user equipment, database, etc.). For the PDP context activation, a permission is requested from the PCF 25. Only the parameters required for the communication between proxy CSCF 26 and PCF 25, and for the communication between GGSN 24 and PCF 25 are shown and described below.

Generally, according to the embodiment shown in FIG. 2, a common identifier is provided in the GPRS/UMTS layer (i.e. GGSN 24 of third generation (3G)), in the IP telephony layer, e.g. CSCF 26, and in the PCF 25 for mapping a PDP context to a call. The subscriber identifier, e.g. IMSI, is not enough when the MS 21 has multiple calls ongoing at the same time. In such a case, the common identifier used according to FIG. 2, is the call identifier Call_Id which already exists in SIP messages. The initiator of a call, in the present example mobile station 21, allocates the Call_Id in a manner known e.g. from SIP protocol which identifier Call_Id uniquely identifies the call.

According to a preferred embodiment such as the one shown in FIG. 2, this common identifier such as Call_Id is sent from the MS 21 to the SGSN 23 and from SGSN 23 to GGSN 24. Further, this common identifier is sent from the mobile station 21 to the proxy CSCF 26, preferably in a call initiating message such as SIP: INVITE. Further, this common identifier is sent from the CSCF 26 to the PCF 25, and furthermore from the GGSN 24 to PCF 25. The PCF 25 then maps a request sent by the GGSN 24 and an authorization sent by the CSCF 26 based on the common identifier (e.g. Call_Id), and decides on call permission and/or connection parameters such as QoS to be used.

In a modified embodiment, an identifier allocated in the GPRS/UMTS layer, e.g. in the GGSN 24, is used as the common identifier. As an example, NSAPI is used as such a common identifier. In this case, in accordance with one embodiment of the invention, the NSAPI is sent from the MS 21 to the CSCF 26 in the INVITE message or other call-set up message. Furthermore, NSAPI is sent from the GGSN 24 to the PCF 25, and from the CSCF 26 to the PCF 25. In this case, the PCF 25 maps a request sent by the GGSN 24 and an authorization sent by the CSCF 26 based on NSAPI.

An operator may configure access point specific information to the GGSN to indicate whether communication with the PCF is required and for what kinds of PDP context, e.g. only when the QoS class indicates conversational, i.e. a voice transmission. The PCF 25 address can also be configured to the GGSN 24 and to the CSCF 26 so that the GGSN 24 and the CSCF 26 can communicate with the same PCF 25.

In an alternative embodiment, when the PCF address is not configured per network element such as elements 24 and 26, a new parameter, e.g. the PCF address, can be included in the subscription information in the subscriber database such as HLR and/or the UMS (User Mobility Server). The SGSN 23 receives the PCF 25 address from the subscriber database, e.g. HLR, and sends it to the GGSN 24. When receiving the PCF 25 address, the GGSN 24 knows which PCF 25 to contact. The CSCF receives the same PCF 25 address from the UMS and can contact the same PCF 25.

It may be home operator specific whether communication with the PCF 25 is required or not. For roaming subscribers, a new parameter describing whether communication with the PCF 25 is required, e.g. an information PCF Interaction Required is added to subscription information in the subscriber database HLR and the UMS. The PCF Interaction Required in the HLR may be subscription specific or may be PDP context specific. The SGSN 23 receives the information PCF Interaction Required from the HLR and sends it to the GGSN 24. When receiving the information PCF Interaction Required, the GGSN 24 knows whether it is necessary to communicate with the PCF or not when establishing a connection or modifying a connection or the like. The CSCF 26 receives the information "PCF Interaction Required from the UMS and knows therefrom whether or not communication with the PCF 25 is required.

Therefore, according to this aspect of the invention, three new ideas are alternatively or combinedly incorporated: (a) a common identifier is provided to map a PDP context to a call; (b) a new parameter for HLR and UMS is provided, namely the PCF address; and/or (c) a new HLR and UMS parameter is provided such as PCF Interaction Required.

According to the embodiment of FIG. 2, the PS (Packet-switched) domain interaction with Policy Control Function (PCF) 25 is shown and described. The steps performed when establishing a connection are described below in more detail with reference to the step numbers shown in FIG. 2.

In step 1, the mobile station 21 sends an INVITE message to the proxy CSCF 26, the INVITE message containing a subscriber identification "Subscriber Id" and a call identifier "CalLId." The proxy CSCF 26 forwards this message to the callee 27.

In step 2, the proxy CSCF 26 receives a positive acknowledgement from the callee terminal 27, e.g. 183w/SDP as defined in SIP. The proxy CSCF 26 forwards this acknowledgement to the mobile station (caller) 21.

In step 3, after receiving the positive acknowledgement from the callee terminal 27, the proxy CSCF 26 sends an authorize message (containing Subscriber Id, call identifier QoS negotiated, callee transport address) to the PCF 25. The Subscriber Id may e.g. be IMSI, MSISDN, or the IP address of the caller 21 (i.e. the PDP address in the GPRS/UMTS layer). The Call_Id is required and used to map the call to the correct PDP context in the PCF 25. The QoS negotiated includes the QoS parameters negotiated for the call. In case of an emergency call, the proxy CSCF 26 will set the QoS parameter allocation/retention priority to the highest value. The callee transport address is used in the GPRS/UMTS layer to set the TFT (Traffic Flow Template) for the PDP context.

In step 4, the PCF 25 may acknowledge the authorize message of step 3 by returning an authorize acknowledge (Subscriber Id, Call_Id) message to the proxy CSCF 26.

In step 5, the MS 21 requests to activate a PDP context (e.g. a secondary PDP context) for the call by sending an Activate (secondary) PDP context request (PDP address, Call_Id, QoS Requested) message to the SGSN 23.

In step 6, a radio access bearer set-up procedure is performed.

In step 7, the SGSN 24 sends a Create PDP context request (Subscriber Id, Call Id, QoS negotiated) message to the GGSN 24.

In step 8, the GGSN 24 requests permission for the PDP context activation by sending a Permission Request (Request Id, Subscriber Id, Wild, QoS negotiated) message to the PCF 25. The first request message (step 8) creates a request state in the PCF 25.

In step 9, the PCF 25 replies by sending a decision (Request Id, QoS negotiated, callee transport address) message to the GGSN 24. The GGSN 24 sets the TFT for the PDP context according to the callee transport address.

In step 10, the GGSN 24 may report that it has acted in accordance with the decision by sending a Report State message (Request Id) to the PCF 25.

In steps 11, 12, the PDP context activation is reported in the known manner.

In FIG. 2, the messages 8 (request), 9 (decision), and 10 (report state) are COPS messages.

FIG. 2 illustrates the case of a PDP context activation. Steps 8 to 10 and the further steps shown in FIG. 2 are the same if the PDP context is to be modified.

It may be operator specific whether a permission for PDP context activation is required from the PCF 25. To provide this function also for roaming subscribers, a new parameter such as "PCF Interaction Required" is included in the subscription information in the HLR. The SGSN receives the "PCF Interaction Required" from the HLR and shall send it to the GGSN 24 at PDP context activation/modification. When receiving the "PCF Interaction Required", the GGSN 24 knows whether or not a communication with the PCF 25 is required when creating or modifying a PDP context.

The GGSN 3, 24, 33 (FIGS. 3 to 5) can know the address of CSCF 4, 26 (or CPS 34 of FIGS. 3 to 5) by resolving the proxy CSCF address from the proxy CSCF domain name (preferred option); from a new parameter "CSCF address" sent by the MS in the (secondary) PDP context activation message; from the TFT of the signalling PDP context.

The parameters to be sent by the GGSN to find the right call or connection in the PCF (CPS; PCF is the logical element; It may be a standalone element or located either in the CSCF or in the GGSN.) may be MS IP address (=PIM address) and MS port number (=TFT destination port number) (preferred option); Peer IP address (=TFT source address) and peer port number (=TFT source port number).

Figure 3:
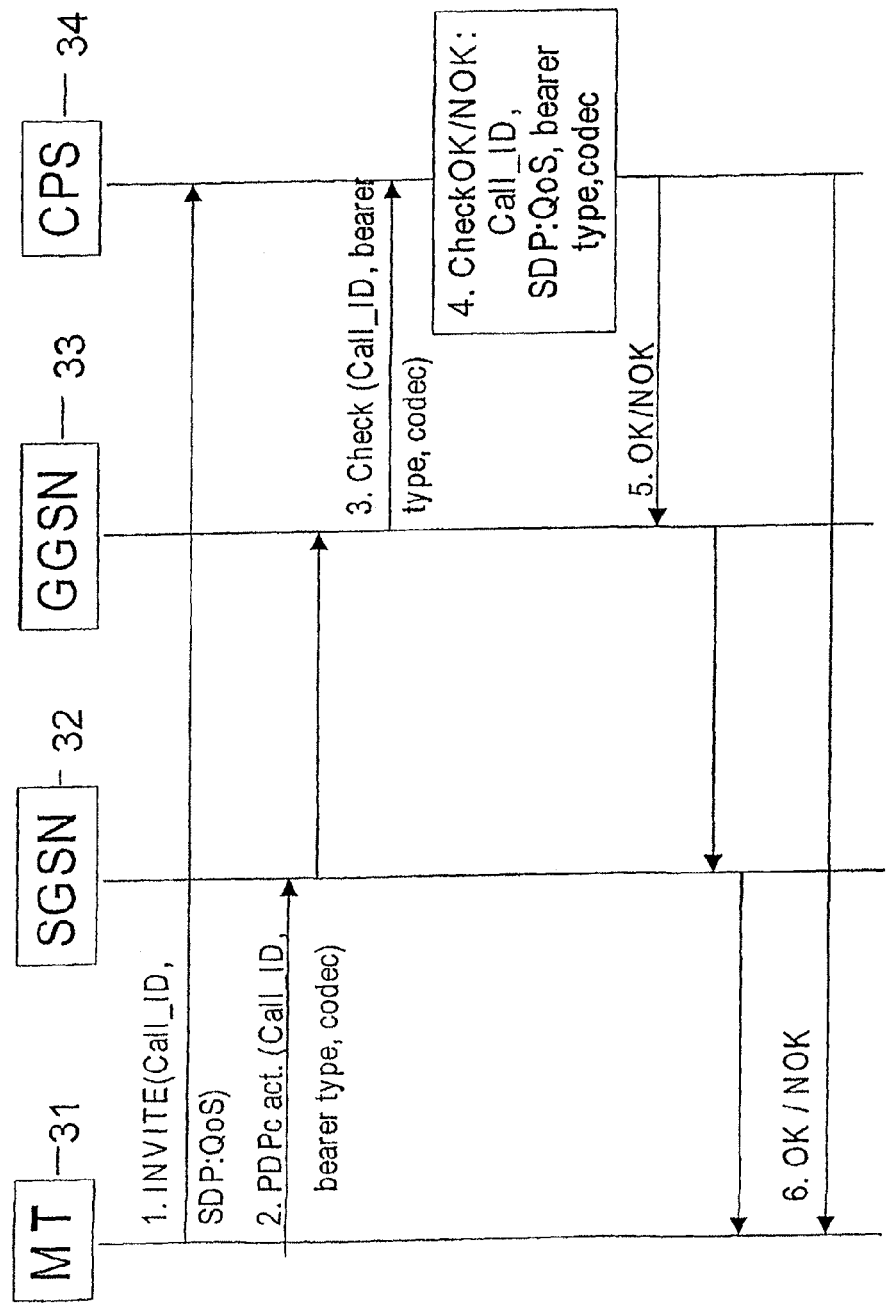
FIG. 3 shows a further embodiment of a system and method in accordance with the present invention.
Figure 4:
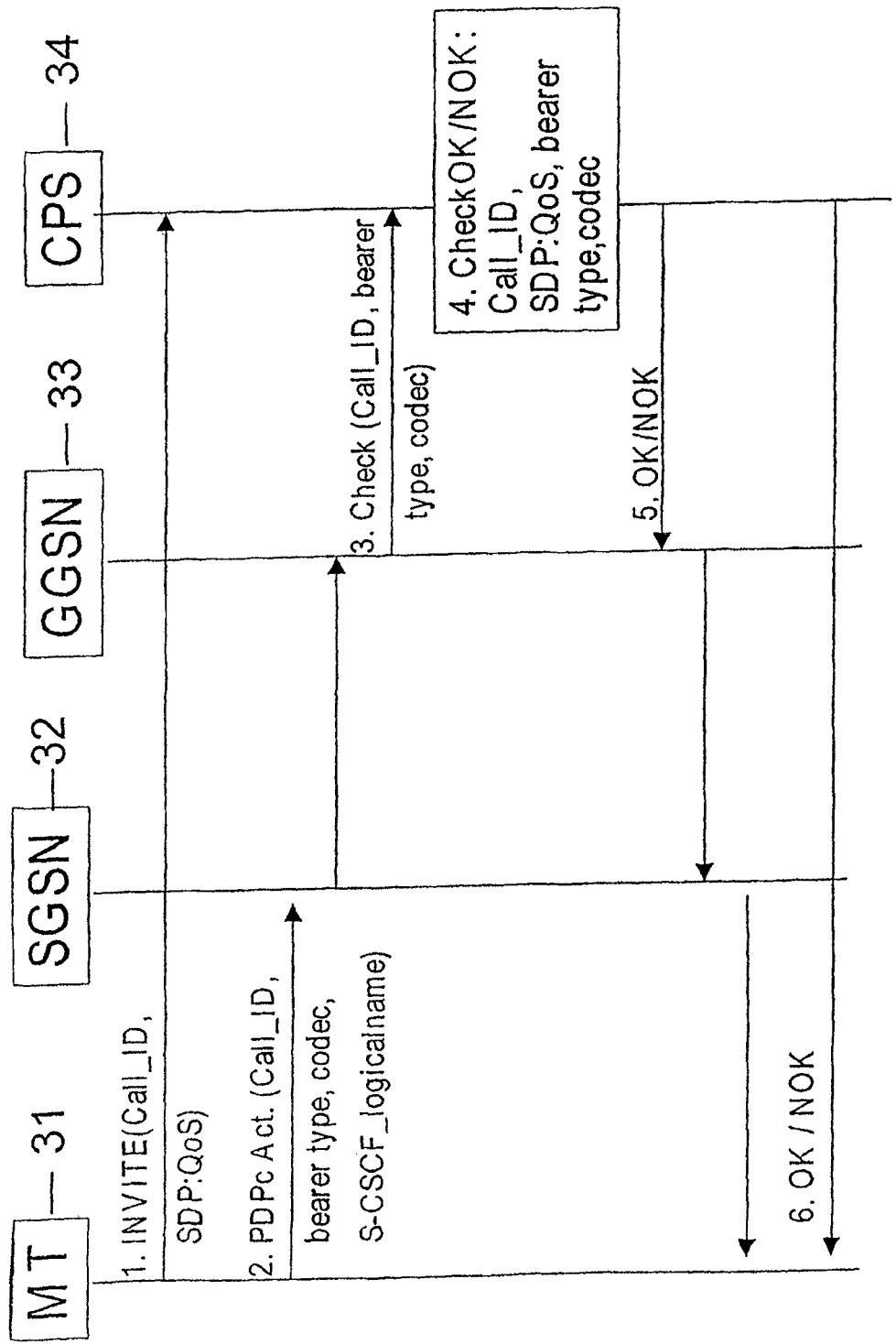
FIG. 4 illustrates another embodiment of a system and method according to the present invention.
Figure 5:
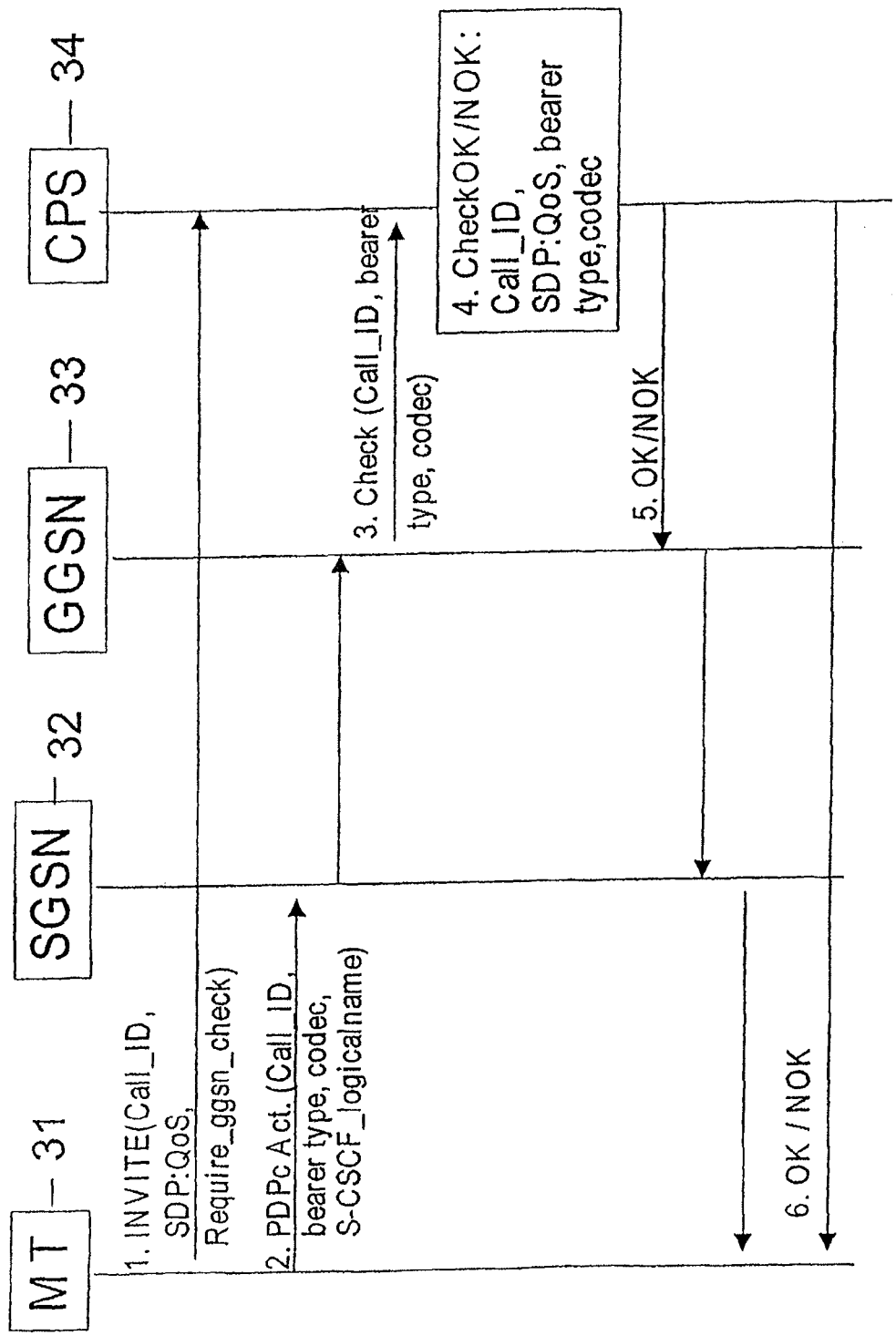
FIG. 5 shows another embodiment of a system and method in accordance with the present invention.

FIGS. 3 to 5 show further embodiments of the present invention which provide a method and mechanism to combine charging infoiniation generated by a mobile core network and an IPT core network. The mobile core network is represented by SGSN 32 and GGSN 33. The further necessary components for providing a mobile network are known to the skilled man and not shown in the drawings. The IPT core network is represented by Call Processing Server (CPS) 34. The further components of the IPT network are known to the skilled man and not illustrated in the drawings.

The embodiments shown in the figures provide the possibility for charging of the QoS level used in telephony calls or connections of other type. As an example, telephony calls require real time (RT) traffic and usually necessitate higher QoS level than a communication of other type such as e-mail transmission (which may be transported using lower QoS level and thus being charged at a lower rate).

The embodiments shown in FIGS. 3 to 5 provide a mechanism for combining call-related charging information and controlling relevancy or coincidence between IPT QoS reservation (e.g. as requested by the call originating terminal in e.g. SIP: INVITE message) and mobile packet core network PDP context QoS (PDP context activation).

FIGS. 3 to 5 show the message transmission between a mobile terminal (MT) 31 attached to the mobile network, SGSN 32, GGSN 33 (SGSN 32 and GGSN 33 forming part of the mobile network to which MT 31 is attached), and Call Processing Server (CPS) 34. The CPS 34 comprises the Call State Control Function (CSCF) such as shown in FIGS. 1 and 2 so that the inscription of block 34 may also be "CSCF".

In the following, the embodiment shown in FIG. 3 will be described in more detail.

When the mobile terminal 31 wants to establish a connection to another network element such as a telecommunication equipment of a party to be called, the mobile terminal 31 issues, as represented by step 1, a acaal establishment request such as an "INVITE" message of a Session Initiation Protocol such as SIP. The INVITE message is sent from MT 31 to CPS 34 and contains the information elements "Call_Id" and "SDP: QoS". SDP stands for Serving Profile DataBase. "Call_Id" represents a common identifier which is provided to allow to combine or otherwise benefit from links in charging data, e.g. CDRs (charging data records) generated by support nodes such as GSNs (GPRS support nodes) and CSCF (or CPS). This common identifier, e.g. "Call_Id" is distributed in the connection establishment phase (e.g. call establishment phase) to the support nodes and CSCF (or CPS). This technique is able to uniquely identify a connection or call to be established in all involved processing elements such as GGSN and CPS without requiring a direct interface between these components. This method and structure provides a mechanism for combining charging data and/or checking QoS validity in different network types which e.g. provide an all-IP-connection between end terminals, e.g. IP telephony.

In a next step 2, the mobile terminal 31 transmits a PDP context activation request to the SGSN 32 which request not only includes the usual information such as bearer type and codec, but additionally the parameter "Call_ID". This parameter "Call_ID" and the further necessary known information elements are thereupon sent from SGSN 32 to GGSN 33 so that GGSN 33 is also informed about the common identifier "Call_ID" attributed to the connection to be established. In a next step 3, the GGSN 33 sends a check request to CPS 34, the check request indicating the common identifier "Call_ID" and further information such as bearer type and codec.

As a next step 4, the CPS 34 (or CSCF contained in CPS 34) performs a check for the connection to be established as identified by the common identifier "Call_ID" and checks that the required QoS parameters are valid in both call signalling (SIP/SDP) and bearer (PDP contexts). The CSCF (CPS 34) performs this check for controlling the validity of the required QoS parameters before accepting (or proceeding with) the call establishment so as to be able to charge for the QoS provided in the call or connection of other type, or for other purposes than charging. The CPS 34 issues OK or NOT OK as result of this check (Call_ID, SDP: QoS, bearer type, codec) and returns (step 5) a response to GGSN 33 indicating the check result (okay/not okay). The GGSN 33 uses the information received in step 5 for accepting (if check result is positive, "OK") or rejecting (if check result is negative, "N OK") the call-related PDP context activation, and returns a response to the SGSN 32 informing the latter on the acceptance or rejection of the PDP context activation (or modification). The SGSN 32 performs the known steps upon receipt of the accept or reject response, and sends corresponding information to the mobile terminal 31.

The CPS 34 (or CSCF) may also directly transmit a response to mobile terminal 31 (step 6) returning a response to the call establishment request of step 1. As an example, a response "OK/NOK" of SIP may be transmitted in step 6.

Therefore, an additional message sequence between CSCF (or CPS) and GGSN 33 is provided for making a decision of how to proceed with a connection to be established.

The CPS (CSCF) 34 may also receive additional parameters in addition to "Call_ID" and base the decision on these additional parameters as well.

The mechanism shown in FIG. 3 and described above is not restricted to QoS and charging aspects only but may also relate to checks or evaluations of other type. Furthermore, the decision made by CPS (CSCF) 34 may also be advisory and needs not be only a binary "OK/NOT OK" type.

As shown in FIGS. 3 to 5, the GGSN 33 is adapted to send the check request to the CPS (CSCF) 34 as step 3. Therefore, GGSN 33 needs information on the address or name of CPS (CSCF). In a case where the GGSN 33 has no knowledge about the serving CSCF (CPS 34) where the mobile terminal 31 has registered with the SIP registration mechanism and has sent the INVITE message, the GGSN 33 has to be informed on the address or name of this serving CSCF (CPS) 34. The embodiment of FIG. 4 presents a solution to this problem.

In addition to the above discussed structure and function of the embodiment of FIG. 3, the embodiment of FIG. 4 provides a new parameter, e.g. "S-CSCF_logicalname", in a POP context activation request for informing GGSN 33 about the address or name of the serving CSCF (or CPS) 34 so that GGSN 33 knows where to send a "QoS check" request.

The embodiment of FIG. 4 is based on the structure shown in FIG. 3 and described above. The above description also applies for the message sequences and performed steps as shown in FIG. 4.

The mobile terminal 31 is informed on the CPS (or CSCF) 34 to which it has registered, and is adapted to include information on the address or name of the S-CSCF (Serving CSCF in CPS 34) in the message sent in step 2 to SGSN 32 and further transmitted to GGSN 33. This new parameter for indicating the address or name of the Serving CSCF is represented in FIG. 4, by the parameter "S-CSCF_logicalname" sent in the PDP context activation request. With this additional information "S-CSCF_logicalname", the GGSN 33 is now informed on the address or name of the correct CSCF (CPS), and sends the check request (step 3) to the CPS (CSCF) 34 indicated by this parameter. The other steps shown in FIG. 4 are identical to same of FIG. 3 described above.

Furthermore, FIG. 5 provides an additional optional feature controllable by an end-user of mobile terminal 31 allowing an end-user or call originating equipment to request a "QoS check", e.g. in a SIP: INVITE message.

The embodiment according to FIG. 5 includes all features of the embodiments of FIGS. 3 and 4 described above. In addition, according FIG. 5, a new parameter, e.g. "Require_ggsn_check", is included into the connection establishment request sent, in step 1, from mobile terminal 31 to CPS (CSCF) 34.

The structure and method shown in FIG. 5 is an addition to the combining mechanisms for charging data and QoS control as described and provided with regard to FIGS. 3 and 4. The embodiment according to FIG. 5 allows an optional selection of performing or not performing the check steps 3 to 5. When the parameter "Require_ggsn_check" is set in the SIP INVITE message (or connection establishment request message of other appropriate type) sent from the mobile terminal 31 to CPS 34, the CPS (or CSCF included in CPS) is prepared to perform the check according to a step 4, and expects the check request message from GGSN 33 according to step 3. After receiving the check request in step 3, the CPS 34 performs the check of step 4 as described above, with the step sequence thereafter being continued as described above. When the parameter "Require_ggsn_check" is not set or not present in the connection establishment request of step 1, the CPS (CSCF) 34 does not perform the QoS check according to step 4 and does not require any check message from GGSN 33. With this information provided by the new parameter "Require_ggsn_check", the CSCF is informed whether or not the check procedure is required to proceed with call establishment. The new check request parameter can of course have any arbitrary designation such as "Require_pdpqos_check" provided that it is understood by the CSCF.

This new parameter provided according to FIG. 5, and the optionality of performing or not performing a QoS check or check of any other type (step 4) is also applicable with a structure as shown in FIG. 3 which does not provide the indication of the logical name or address of CPS 34 according to step 2 of FIG. 4. In particular in a case where the GGSN 33 is informed by other means on the address of CPS 34 to which MT 31 is registered, e.g. by sending a message from CPS 34 to GGSN 33.

The methods and mechanisms provided according to the embodiments of the invention may be implemented as software executed by at least one processor and memory in GGSN 3, 33 and/or CSCF/CPS 34 allowing a proper execution of the requests and checks as well as check result processing and charging information generation for providing a charging record for established connections.

The provided method and mechanism for checking QoS parameters may also be implemented separately from charging information generation.

The shown embodiments furthermore provide the possibility of controlling and inhibiting e.g. PDP context update for PDP contexts allocated for voice calls until a check from CPS 34 is performed. This can be managed by providing another message exchange between GGSN 33 and CPS 34.

Figure 6:
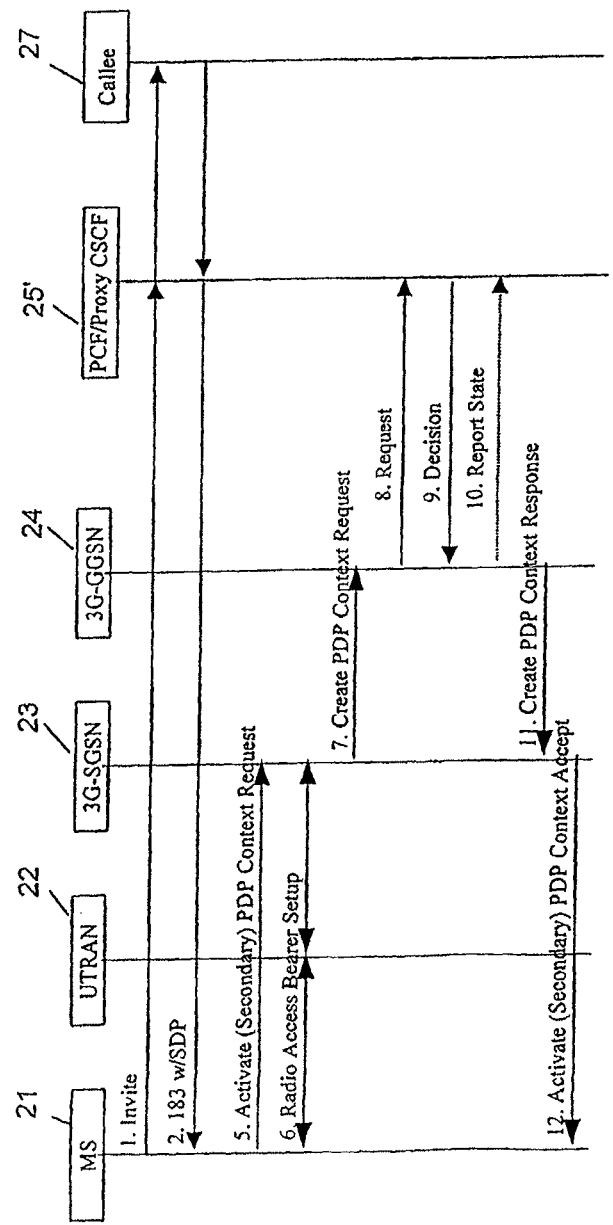
FIG. 6 illustrates a modification of the embodiment shown in FIG. 2.

FIG. 6 shows a further embodiment of the invention (method and/or system) which is a modification of the embodiment shown in FIG. 2. According to FIG. 6, the PCF 25 (FIG. 2) is integrated with the Proxy CSCF 26 (FIG. 2) and forms a single network element 25'. This structure provides the benefit of avoiding any external signalling between the PCF and CSCF so that the steps 3 and 4 of FIG. 2 can be omitted. The authorization check according to these steps 3, 4 of FIG. 2 is performed using internal processing within network element 25' of FIG. 6. The signalling between PCF and CSCF is in this case merely an internal signalling (i.e. not so strictly limited by any standardization).

The further steps 1, 2, and 5 to 12 of FIG. 6 are identical to the ones described above with regard to FIG. 2.

The PCF may therefore be a separate logical entity 25 as shown in FIG. 2, may be integrated to the CSCF as shown in FIG. 6, or may also be integrated to the GGSN 24.

Figure 7:
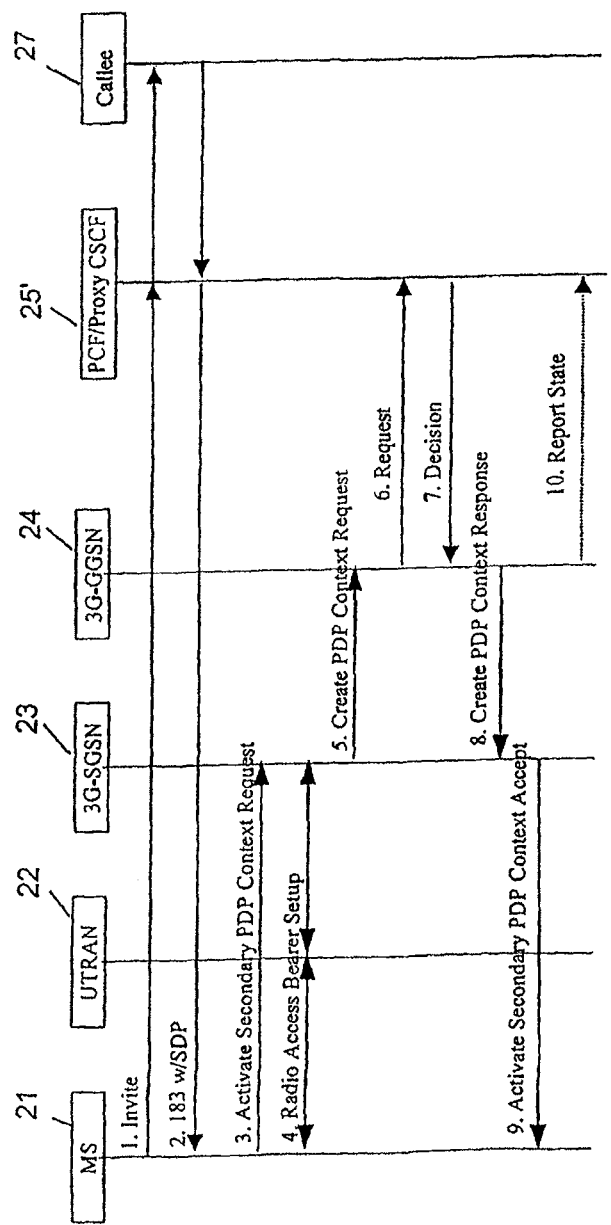
FIG. 7 shows another embodiment of a system and method in accordance with the present invention

FIG. 7 shows another embodiment of a system and method in accordance with the present invention which provides a call-based PDP context activation/modification. FIG. 7 presents a PDP context activation in case of a MO call. It is assumed that at least one PDP context is activated for the call. For the PDP context activation, a permission is requested from the PCF. The permission from the PCF is required to adjust the QoS of the PDP context to the QoS of the call. It could be configured to the GGSN whether a decision is needed from the PCF and for what kind of PAP contexts. As an example, the configuration information can define that a decision from the PCF is needed only for conversational PDP contexts, while for other PDP contexts, the PDP context activation shall proceed without PCF interaction. Only the parameters which are required for the GGSN-PCF communication are shown and described below. In the following, the steps shown in FIG. 7 will be described in detail.

Step 1. The MS sends the Invite (Subscriber Id) message to the proxy CSCF. The proxy CSCF forwards the message towards the callee.

Step 2. The proxy CSCF receives a positive acknowledgement, e.g. 183 w/SDP. The proxy CSCF forwards the acknowledgement to the caller.

Step 3. The MS activates a PDP context for the call by sending the Activate Secondary PDP Context Request (QoS Requested) message to the SGSN.

Step 4. The radio access bearer setup procedure is performed.

Step 5. The SGSN sends the Create PDP Context Request (PDP Address, QoS Negotiated) message to the GGSN.

Step 6. The GGSN requests permission for the PDP context activation by sending the Request (Request Id, Subscriber Id, QoS Negotiated) message to the PCF. The Subscriber Id is an identifier known both in the PS domain and in the IM subsystem, e.g., the IP address of the MS.

Step 7. The PCF replies by sending the Decision (Request Id, QoS Negotiated) message to the GGSN.

Steps 8-9, The PDP context activation is accepted with the parameters received from the PCF.

Step 10. The GGSN may report that it has successfully completed performing the decision by sending the Report State (Request Id) message to the PCF.

The steps 6, 7 and 10 are the same if the PDP context is modified.

Although preferred embodiments have been shown and described above, the invention is not limited to the details described and shown and intends to cover all modifications, omissions, and additions of the features described above and shown in the drawings.

As an example, the invention is not limited to a communication between GGSN (3, 24) and PCF-CSCF (or CSCF/PCF). The same communication is possible by replacing the GGSN 3, 24 with the SGSN 2, 23, resulting in SGSN-PCF-CSCE (or CSCF/PCF) communication.

The invention claimed is:

1. An apparatus comprising:
   at least one processor; and
   at least one memory including computer program code, which when executed causes the apparatus to at least:
   receive information of a connection for a call between a user equipment and a called party,
   send a permission request to a network node requesting permission for the connection, the permission request specifying at least one of the user equipment, the called party, and the connection,
   receive from the network node a response specifying at least one of a permission for the connection and a connection parameter, and
   control the connection dependent on the response,
   wherein the apparatus is configured as a gateway general packet radio service support node.

2. The apparatus according to claim 1, wherein the network node is configured as a call state control function.

3. The apparatus according to claim 1, wherein the network node is configured as a policy control function.

4. The apparatus according to claim 1, wherein the permission request comprises at least one of the following: an international mobile subscriber identity, a packet data protocol address, a destination address for the connection, a traffic flow template, or a network layer service access point identifier.

5. The apparatus according to claim 1, wherein the permission request comprises a connection parameter comprising at least one of the following: an accepted quality of service value, an accepted bearer party information, or an indication of whether the connection is an emergency connection.

6. The apparatus according to claim 1, wherein the response further comprises an international mobile subscriber identity.

7. An apparatus comprising:
   at least one processor; and
   at least one memory including computer program code, which when executed causes the apparatus to at least:
   send a message, wherein the message initiates, at a network node, at least receiving information of a connection for a call between the apparatus and a called party,
   send a permission request to another network node requesting permission for the connection, the permission request specifying at least one of the apparatus, the called party, and the connection,
   receive from the other network node, a response specifying at least one of a permission for the connection or a connection parameter, and
   control the connection dependent on the response,
   wherein the network node is configured as a gateway general packet radio service support node.

8. A method comprising:
sending, by a user equipment, a message, wherein the message initiates, at a network node, at least receiving information on a connection for a call between the user equipment and a called party, sending a permission request to another network node requesting permission for the connection, the permission request specifying at least one of the user equipment, the called party, or the connection, receiving from the other network node, a response specifying at least one of a permission for the connection or a connection parameter, and controlling the connection dependent on the response; and
receiving, at the user equipment, a response to the message, wherein the network node is configured as a gateway general packet radio service support node.

9. An apparatus comprising:
at least one processor; and
at least one memory including computer program code, which when executed causes the apparatus to at least:
  receive information of a connection for a call between a user equipment and a called party,
  send a permission request to a network node requesting permission for the connection, the permission request specifying at least one of the user equipment, the called party, and the connection,
  receive from the network node a response specifying at least one of a permission for the connection and a connection parameter, and
  control the connection dependent on the response, wherein the apparatus is configured as a gateway general packet radio service support node.

10. An apparatus comprising:
at least one processor; and
at least one memory including computer program code, which when executed causes the apparatus to at least:
  send a message, wherein the message initiates, at a network node, at least receiving information of a connection for a call between the apparatus and a called party,
  send a permission request to another network node requesting permission for the connection, the permission request specifying at least one of the apparatus, the called party, and the connection,
  receive from the other network node, a response specifying at least one of a permission for the connection or a connection parameter, and
  control the connection dependent on the response, wherein the apparatus is configured as a user equipment, and wherein the network node is configured as a gateway general packet radio service support node.

* * * * *